Sept. 2, 1969  M. M. ROSS  3,464,362

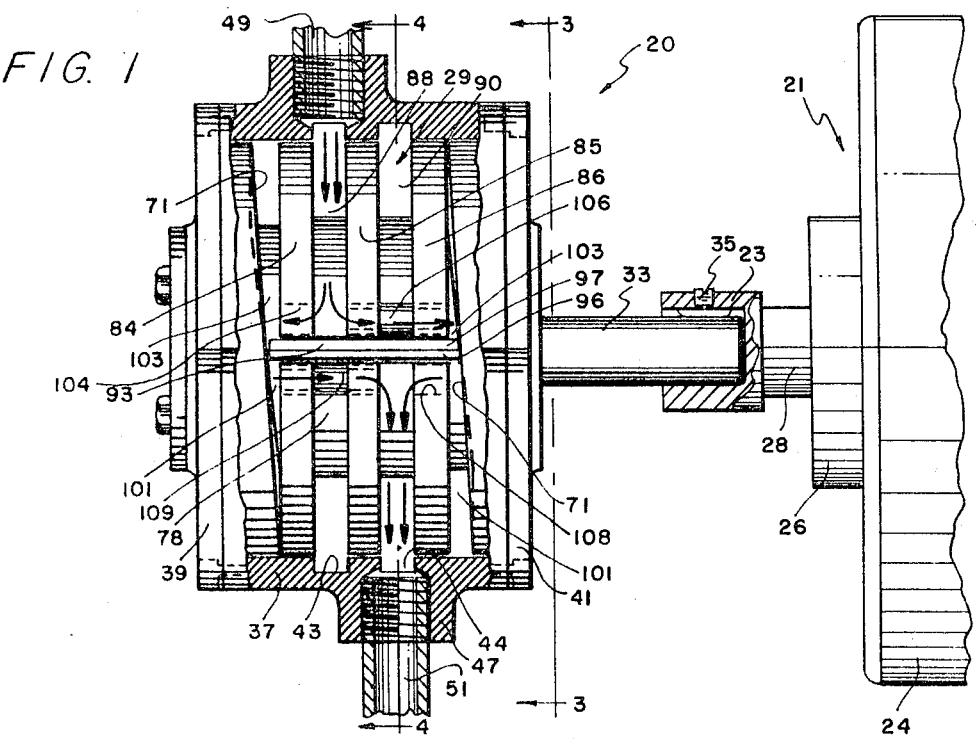
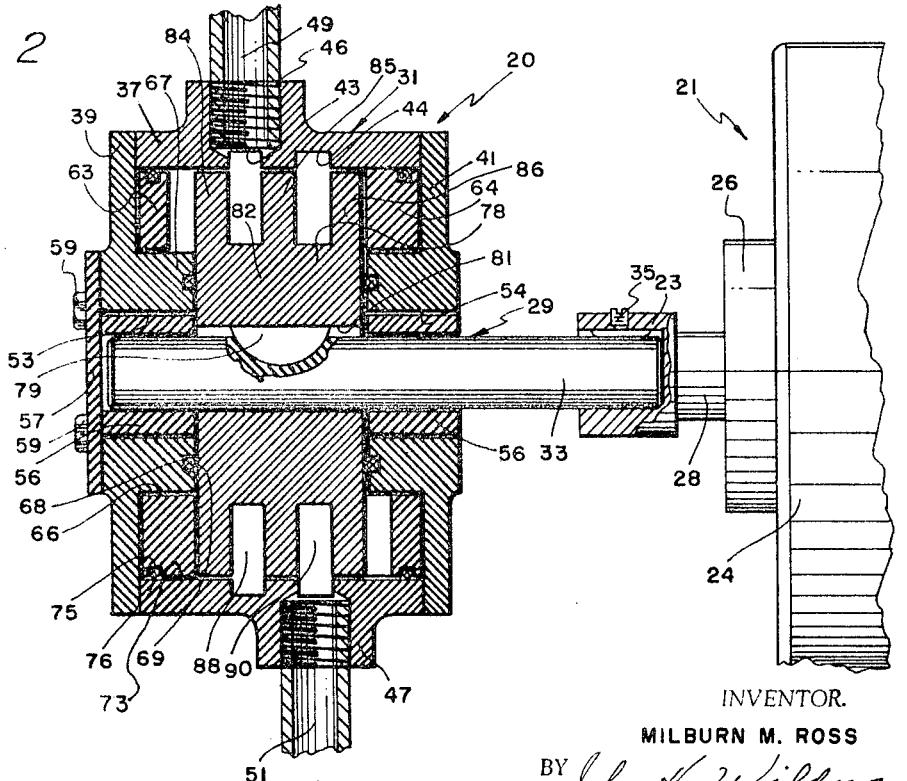

ROTARY POWER MEANS

Filed Aug. 14, 1967  5 Sheets-Sheet 2

INVENTOR.
MILBURN M. ROSS
BY John H. Widdowson
Phillip A. Bein
ATTORNEYS

Sept. 2, 1969     M. M. ROSS     3,464,362

ROTARY POWER MEANS

Filed Aug. 14, 1967     5 Sheets-Sheet 4

INVENTOR.
MILBURN M. ROSS
BY John H. Widdowson
Phillip A. Bein
ATTORNEYS

United States Patent Office 3,464,362
Patented Sept. 2, 1969

3,464,362
ROTARY POWER MEANS
Milburn M. Ross, 631 N. Bluff, Wichita, Kans. 67208
Filed Aug. 14, 1967, Ser. No. 660,287
Int. Cl. F04c *1/00, 3/00*
U.S. Cl. 103—139          5 Claims

ABSTRACT OF THE DISCLOSURE

An axial vane type pump or motor having cam actuated axially movable vane members mounted for rotation in a rotor member. The device further includes fluid separating partition means upon the rotor and pressure actuated by-pass means.

---

Various types of rotary pumps and motors are known to the prior art provided with one or more movable vane members within an eccentric housing; however, such devices are generally structurally complicated and unsatisfactory in operation. For example, the prior are devices are normally provided with spring biased vane members and a plurality of check valves each subject to constant, considerable wear with resultant repair and maintenance required. Additionally, the prior art vane type pumps are subject to rapid deterioration of the vane members with resultant fluid leakage and unsatisfactory operation plus resulting in damage to the fluid seal members therein and other such elements.

In accordance with the present invention, a new power means is provided connectible to a motor member operable to be driven in either direction by the motor member as a fluid pump means or conversely, to drive the motor member by fluid under pressure supplied to the power means thereby acting as a drive motor means. The power means as a pump means, includes a housing means having fluid inlet and outlet sections and a rotor means contained therein operably connected to the motor member. The housing means is provided with a main cylindrical body having opposite open ends closed by end plates thereby forming a central cavity therebetween adapted to receive a main portion of the rotor means. Secured to the respective end plates as by bolt members are cam plates having contoured inwardly projected faces whereby each point on one face is equal distance from the closest point on the opposite or other face. The rotor means includes a central shaft rotatably mounted on bearing means in the housing means, the shaft having a main rotor member connected thereto and a vane member mounted on the rotor member engageable with the main cylindrical body and the cam plates. The rotor member includes a central hub having three radially extended spacer plates forming an inlet channel and an outlet channel between respective pairs of the spacer plates and having respective grooves formed in the main cylindrical body aligned therewith. The inlet channel is aligned with the inlet section to receive fluid therefrom and, similarly, the outlet channel is operably connected to the outlet section to convey fluid under pressure therethrough. It is to be remembered that this flow may be reversed if the rotor means is rotated in the opposite direction by the motor member. A vane member extends transversely of the spacer plates and is in sealing engagement with the cam plates, the central hub, and the inner surface of the cylindrical body of the housing means. The vane member is movable axially of the central hub and the shaft by engagement of opposite ends with respective ones of the cam plates to increase and decrease the relative areas between the outermost spacer plates and the respective cam plates. The rotor means is provided with a first conduit means positioned adjacent and rearwardly of the vane member to supply inlet fluid transversely of the spacer plates into the area between the cam plates and outermost spacer plates. A second conduit means positioned adjacent and forwardly of the vane member interconnects the outlet channel with a like area between the cam plates and outer spacer plates preceding the vane member. On rotation of the rotor means, the area before the vane member and adjacent the cam plates becomes progressively smaller to force the fluid outwardly through the second conduit means to the outlet channel and through the outlet section under pressure. Simultaneously, the rotating rotor member acts to create a suction behind the vane member to continuously pull, under the vacuum pressure, fluid therein between the cam plates and outer spacer plates for subsequent discharge under pressure by the vane member on further rotation thereof. The above described pump means can be readily converted to a motor means on supplying fluid under pressure through the outlet section or inlet section, depending on the desired direction of rotation, to apply force against the vane member to rotate the rotor means and interconnected central shaft and drive the motor member which may be a generator or the like. Additionally, it is obvious that the cam plates can be formed with a plurality of high and low cam surfaces in conjunction with a corresponding number of vane members and such is important in use of the power means as a motor means as the same results in a high work output per degree of loss in fluid pressure.

In another embodiment of the power means of this invention, a pressure regulator means is connected to the previously described housing means having an upright chamber interconnected by independent passageways to the inlet and outlet channels respectively. The regulator means includes a plunger member within the upright chamber biased by a spring member therein to a sealing position against the passageways. On reaching a predetermined pressure within the power means greater than the spring pressure, the plunger member is lifted upwardly to bypass pressure fluid from, for example, the outer channel into the inlet channel thereby providing a means of readily regulating the desired pressure to be discharged therefrom.

Additionally in still another embodiment of the power means, it is noted that the adjacent contacting portions of the vane member, the cylindrical body of the housing means, the spacer plates, and the cam plates results in possible wear with resultant leakage of pressurized fluid from the outlet channel to other internal portions of the power means. To prevent this leakage fluid under pressure from forcing out, for example, the bearing members about the central shaft of the rotor means, the central hub of the rotor member is provided with a transverse opening operably connected to the bearing members and outermost spacer plates and having holes extended into the inlet and outlet channels, respectively. Mounted within the holes are ball type check valves operable to restrict fluid flow into the transverse opening from the inlet and outlet channels. However, fluid leakage about the aforementioned contacting portions of wear is conveyed into the transverse opening instead of against the bearing members and is movable through one of the ball type check valves into the low pressure channel, normally, the inlet channel. The other channel is under pressure thereby sealing that respective check valve to prevent leakage therefrom and it is seen that the provision of two ball type check valves permits the power means to be operable in either direction of rotation and still provides this self-sealing feature.

In one other embodiment of the rotary power means of this invention, the inlet and outlet channels are each provided with at least one blade member positioned adjacent the vane member on opposite sides thereof. The blade members are operable to pick up inlet fluid within the respective outer groove in the main cylindrical body and direct the same inwardly to the respective conduit means for movement between the outermost spacer plates and the cam plates. It has been found that at high speed rotation of the rotor means that the blade members are necessary to increase the efficiency of operation and prevent inlet fluid starvation. Also, it has been noted that a plurality of inclined blade members mounted in each of the inlet and outlet channels operates to greatly increase the efficiency of the power means.

Accordingly, it is an object of this invention to provide a rotary power means overcoming the above-mentioned disadvantages of the prior art devices.

Another object of this invention is to provide a power means operable in either direction of rotation and readily usable as a pump means or a motor means, whichever is required.

A still further object of this invention is to provide a pump means having a rotor means mounted within a housing means operable to efficiently and effectively produce a non-pulsating, constant volume flow of fluid output under pressure.

One other object of this invention is to provide a pump means having a pair of opposed cam plates and a vane member in constant contact therewith operable to continuously pull pressure fluid therein and discharge the same under pressure.

Still, one other object of this invention is to provide a pump means having a pressure regulator means thereon operable to control the desired pressure output and ball type check valve means operable to recirculate internal leakage fluid to prevent damage to the structure and prevent external fluid leakage.

One other object of this invention is to provide a rotary motor means having a rotor means with a plurality of spaced vane members operable to produce the maximum amount of work from pressure fluid received thereto with a minimum pressure drop.

One further object of this invention is to provide a rotary pump means having a housing means, a rotor means mounted therein, and a vane member movable axially within the housing means providing the only movable working part in the entire pump means except for the rotational movement of the rotor means.

Still, a further object of this invention is to provide a rotary pump means having a housing means, a rotor means mounted within the housing means operable to receive and impart pressure to a fluid medium, and said rotor means having a plurality of spacer plates interconnected by blade members operable to increase the input and output efficiency thereof.

Another of the objects of this invention is to provide a rotary power means having a minimum amount of moving parts operable to produce a maximum output from a minimum input, such structure being economical to manufacture, substantially maintenance-free, and highly efficient and effective in operation.

Still, one further object of this invention is to provide a rotary power means operable in either direction of rotation as either a pump or a motor means having a constant, non-pulsating output.

Various other objects, advantages and features of the invention will become apparent to those skilled in the art from the following discussion, taken in conjunction with the accompanying drawings, in which:

FIG. 1 is an elevational view of the power means of this invention interconnected to a drive motor member and having portions thereof broken away for clarity;

FIG. 2 is a sectional view of the power means of this invention as connected to the drive motor member;

Figure 3:
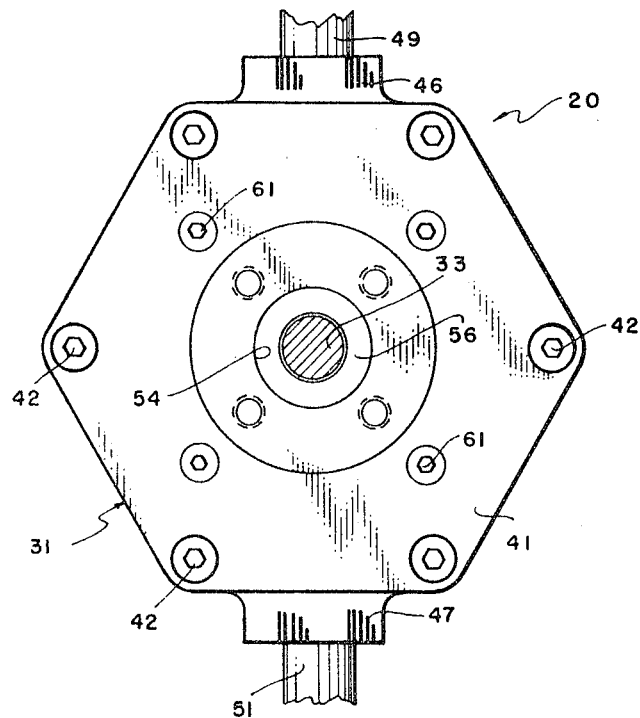
FIG. 3 is an elevational view taken along line 3—3 in FIG. 1.

The following is a discussion and description of preferred specific embodiments of the new rotary power means of this invention, such being made with reference to drawings, whereupon the same reference numerals are used to indicate the same or similar parts and/or structure. It is to be understood that such discussion and description is not to unduly limit the scope of the invention.

Referring to the drawings in detail and in particular to FIG. 1, the power means of this invention, indicated generally at 20, is illustrated as connected to a motor member or means 21 through a coupling member 23. As will become apparent, the power means 20 can be driven by the motor means 21 thereby acting as a pump or, instead, may be supplied with fluid under pressure to drive the motor means 21 which may act as a generator or the like. In the illustration of FIGS. 1–4, inclusive, the power means 20 will be assumed to be acting as a pump driven by an electric motor 24. More specifically, the electric motor 24 includes a housing 26 rotatably enclosing an output shaft 28 having the coupling member 23 secured to the outer end thereof.

Although mention will be made herein of inlet and outlet conduits, channels, etc., it is to be understood that the function of such elements as an inlet or outlet will depend on the direction of rotation of the power means as will become obvious.

The power means 20 includes a rotor means 29 rotatably mounted within a housing means 31 having a laterally extended shaft 33 with an outer end thereof connected to the coupling member 23 as by a set screw 35. The housing means 31 has a substantially cylindrical main body 37 having opposite open ends closed by end plates 39 and 41 secured thereto as by bolt members 42. The main body 37 is provided with a pair of parallel lower circumferential grooves 43 and 44 intercepting an inlet section 46 and an outlet section 47, respectively. The inlet section 46 and the outlet section 47 are actually threaded openings into which are connected, respectively, pipe or hose members 49 and 51 adapted to convey fluid to and from. The end plates 39 and 41 are provided with central openings 53 and 54, respectively, and having bearing members 56 therein adapted to rotatably support the shaft 33. A special closure plate 57 is secured by bolts 59 to the end plate 39 to cover the opening 53 whereas the shaft 33 extends outwardly of the other opening 54.

Figure 7:
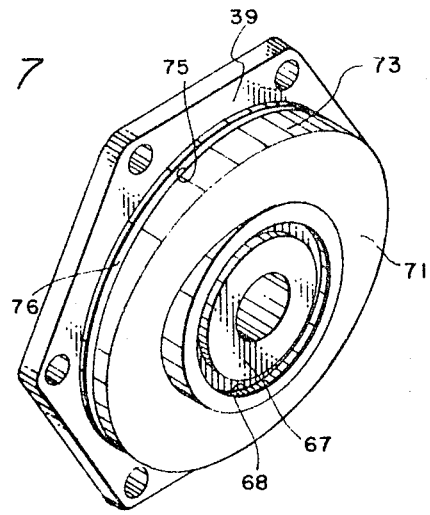
FIG. 7 is a perspective view of a cam and end plate assembly of the first embodiment of this invention as shown in FIGS. 1–4, inclusive.
Figure 8:
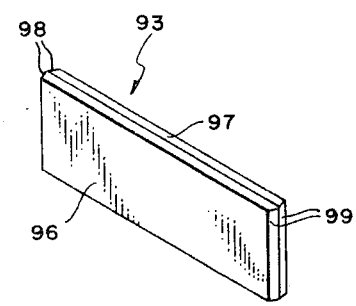
FIG. 8 is an enlarged perspective view of a vane member of the power means of this invention.

As shown in FIGS. 1 and 2, mounted within the main body 37 and secured by bolt members 61 to the inner surfaces of the end plates 39 and 41, are cam plates 63 and 64, respectively. As the cam plates 63 and 64 are substantially identical, only one need be described in detail. The cam plate 63 is of a ring shape having a central opening 66 to be mounted about a cylindrical projection 67 of the end plate 39 (FIG. 7). It is seen that the cylindrical projection 67 is provided with a groove 68 to receive an O-ring 69 for sealing engagement with the rotor means 29. A back side of the cam plate 63 is flat and bolted against the end plate 39; however, the opposite side is contoured to form a cam surface 71 having a high point and a low point interconnected by gradually sloping surface area. An outer cylindrical surface 73 of the cam plate 63 is provided with a groove 75 adapted to receive an O-ring 76 to provide a fluid seal with the adjacent surface of the main body 37 (FIG. 2). It is obvious that the end plate 39 and the cam plate 63 could be of an integral one-piece construction; however, the structure as described permits the ready replacement of the cam plate 63 which is subject to wear.

The rotor means 29 includes a rotor member 78 secured to the shaft 33 for conjoint rotation therewith by a lock key 79 mounted within a groove in the shaft 33 and extended within an axial slot 81 in a hub portion 82 of the rotor member 78. It is seen that the rotor member 78 is of a width to fit snugly between the cam plates 63 and 64 being in contact with the high cam portions thereof. The rotor member 78 includes a plurality of spacer plates 84, 85 and 86 integral with the hub portion 82 extended radially to a close fit with the inner wall of the cylindrical body 37 of the housing means 31. Between the spacer plates 84 and 85 is formed an inlet channel 88 (may function as an *outlet* depending on the direction of rotor rotation as will be explained) aligned with the circumferential groove 43 in the main body 37 to continuously receive fluid from the fluid inlet section 46. Likewise, the area between the spacer plates 85 and 86 forms an outlet channel 90 aligned with the other groove 44 to convey fluid to the outlet section 47.

Figure 4:
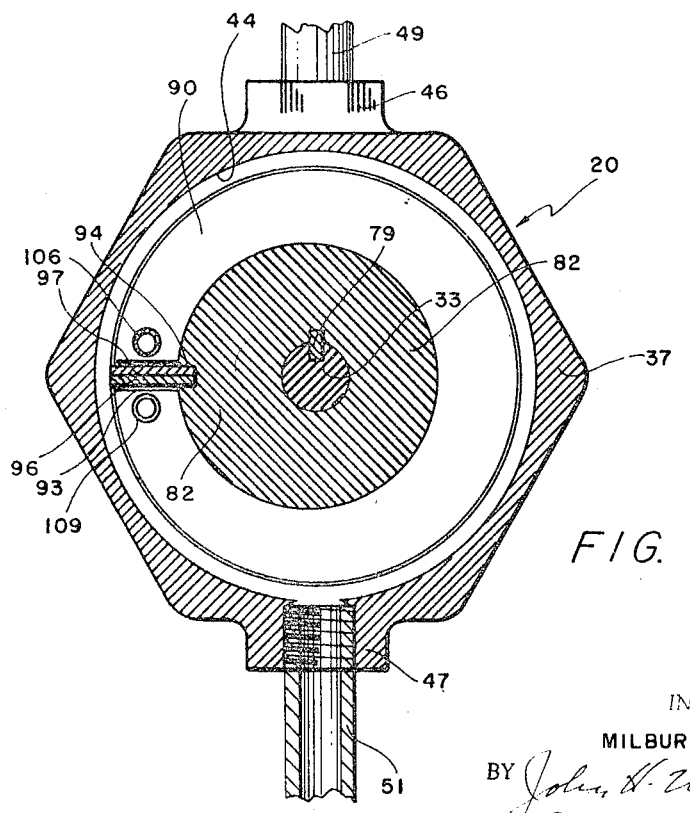
FIG. 4 is a section view taken along line 4—4 in FIG. 1.

As shown in FIGS. 1 and 4, the rotor means 29 further includes a vane member 93 extended transversely through the spacer plates 84, 85, and 86 having an inner portion engageable and movable within a slot 94 in the hub portion 82. The vane member 93 has one or more cooperating plates 96 and 97 each having oppositely inclined end surfaces 98 and 99 engageable in fluid sealing relationship with the cam plates 63 and 64, respectively, and an outer side surface similarly engageable with the inner surface of the cylindrical body 37. The plates 96 and 97 can be sectional, spring-loaded, or have sealing rings, if desired as one skilled in the art will appreciate. It is seen, therefore, that the vane member 93 cooperates with the outer spacer plates 84 and 86 and the contacting high cam points on the cam plates 63 and 64 respectively, to divide the area before and after the vane member 93 into exhaust and intake sections 101 and 103, respectively. It is to be noted, as shown in FIG. 4, that the hub portion 82 may be offset relative to the shaft 33 so as to compensate for weight loss in the spacer plates 84, 85 and 86 by connection of the vane member 93 thereto. In this manner, the rotor means 29 can be maintained in perfect balance for quiet, efficient operation as will be explained.

Immediately behind the vane member 93 is an opening 104 through the spacer plate 84 aligned with a first conduit means 106 extended transversely of the other spacer plates 85 and 86 whereby fluid is readily movable from the inlet channel 88 laterally into the intake sections 103. It is obvious that on counterclockwise rotation of the motor means 29, as viewed in FIG. 4, the intake sections 103 continually increase in area to pull the fluid therein.

Similarly, forward of the vane member 93 is an opening 108 through the spacer plate 86 and a second aligned conduit means 109 providing a fluid passage transversely of the other spaced plates 84 and 85. In this instance, fluid under pressure is movable forwardly of the rotating vane member 93 in the exhaust sections 101 and forced into the outlet channel 90 for discharge through the outlet section 47.

Figure 9:
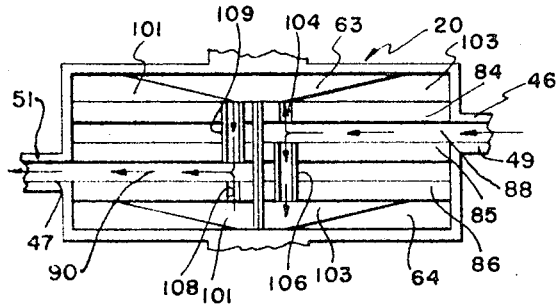
FIG. 9 is a schematic diagram of one operation of the power means of this invention.

In the use and operation of the power means 20 of this invention as the pump means of FIG. 9, a fluid such as water, oil, gas, or the like is supplied through the pipe member 49 to the inlet channel 88. On rotation of the rotor means 29 so as to cause movement to the left of the vane member 93, as viewed in FIG. 9, it is seen that the intake sections 103 behind the vane member 93 continually increase as to create a vacuum to aid in the pulling of fluid thereto. Simultaneously, the area of the exhaust sections 101 forwardly of the vane member 93 is continuously decreasing in cross sectional area to force the fluid therefrom into the outlet channel 90 to be discharged through the outlet section 47 and the pipe member 51. It is seen that the vane member 93 contacts the opposed cam plates 63 and 64, revolves with the rotor member 78, and moves axially resulting in a continuous supply and exhaust of fluid. Because of the uninterrupted flow of fluid, it is obvious that the power means 20 operates to provide a constant volume non-pulsating output. Additionally, the continuous, balanced rotation of the rotor means 29 results in a non-vibrating pump means operable with a minimum amount of power being substantially noiseless in operation.

As readily noted in the schematic of FIG. 9, it is obvious that on the reverse rotation of the rotor means 29 plus changing the fluid inlet, the power means 20 would operate in the same manner described above merely supplying fluid under pressure in the opposite direction. Additionally, it is seen that the supply of fluid under pressure to the power means 20 through either the inlet section 46 or the oulet section 47 would act against the vane member 93 to drive the shaft 33. This power output through the shaft 33 can be used to drive a generator or the like with the power means 20 now acting as a motor means.

Figure 5:
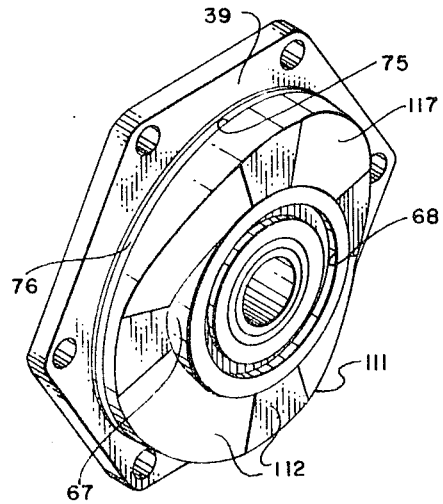
FIG. 5 is a perspective view of a cam and end plate assembly of a second embodiment of the power means of this invention.
Figure 6:
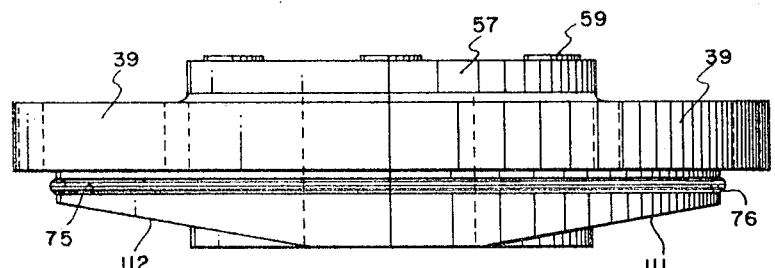
FIG. 6 is a top plan view of the cam and end plate assembly as shown in FIG. 5 of the power means of this invention.

However, in the use of the same as a motor means, it is desirable that the cam plates 63 and 64 be provided with a plurality of cam surfaces 71 to increase the power output from a given pressure supply. As shown in the second embodiment of FIGS. 5 and 6, the end plate 39 is provided with a cam plate 111 having four high and low cam surface areas 112. In this embodiment, a rotor means (not shown) will be provided with spaced vane members 93. This embodiment would operate substantially identical to the first embodiment as described except, as a motor means, the increased working area resulting from a plurality of the vane members 93 would increase the output from a given pressure drop thus develop more power when acting as a motor means.

Figure 11:
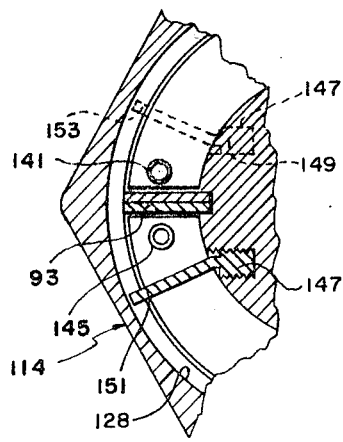
FIG. 11 is a fragmentary sectional view of a fluid control portion of the third embodiment of the power means of this invention.
Figure 10:
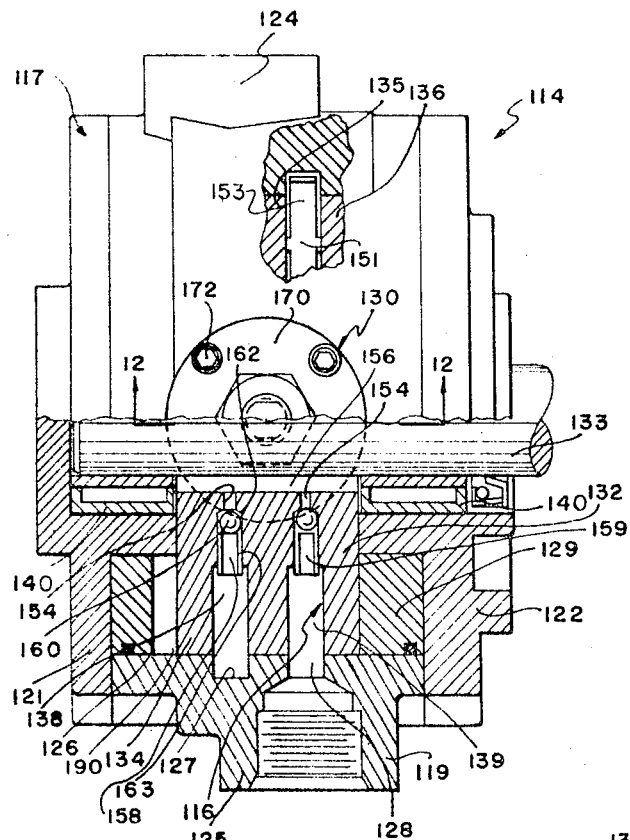
FIG. 10 is an elevational view of a third embodiment of a power means of this invention having portions thereof broken away for clarity.
Figure 12:
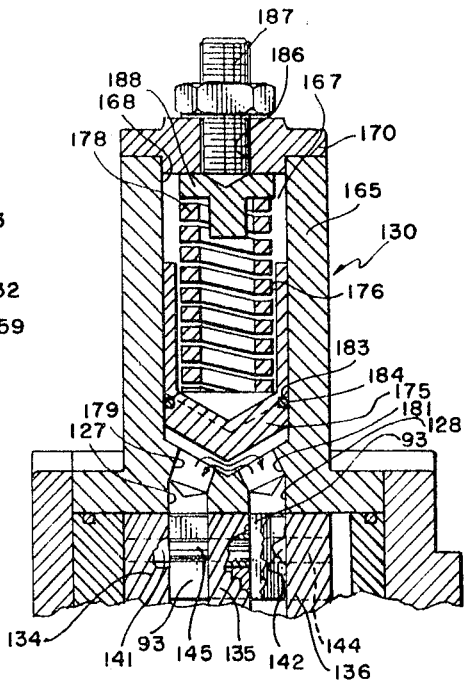
FIG. 12 is a fragmentary sectional view taken along line 12—12 in FIG. 10 having a vane member rotated 90°.

In a third embodiment of this invention as shown in FIGS. 10–12, inclusive, a power means 114 is provided having a rotor means 116 mounted within a housing means 117. The housing means 117 includes a main body 119 enclosed by end plates 121 and 122 having inlet and outlet sections 124 and 125 cooperating with circumferential grooves 127 and 128, respectively. Cam plates 126 and 129 are secured to the end plates 121 and 122, respectively. Additionally, the housing means 117 is provided with a laterally extended pressure regulator means 130. The rotor means 116 includes a rotor member 132 secured to a shaft 133 and having radially projected spacer plates 134, 135, and 136 to form inlet and outlet channels 138 and 139 cooperating with the inlet and outlet sections 124 and 125. The rotor member 132 is carried on bearing members 140 and adapted to receive one of the previously described vane members 93. An opening 141 and first conduit means 142 extended transversely of the spacer plates 134, 135, and 136 are positioned adjacent and rearwardly of the vane member 93 and an opening 144 and second conduit means 145 are positioned forwardly thereof. The rotor member 132 has a pair of spaced threaded openings 147 positioned on opposite sides of the vane member 93 extended parallel thereto, each adapted to receive one of blade members 149 and 151. The blade members 149 and 151 are provided with outwardly, fluid directing portions 153 extended substantially radially relative to the rotor means 116 and having outer ends thereof positioned within the respective circumferential grooves 127 and 128. The blade members 149 and 151 are operable to direct fluid from within the respective inlet and outlet channels 138 and 139 downwardly towards the rotor member 132 for movement laterally through the respective conduit means 142, 145, and openings 141, 144. It is obvious that blade members 149 and 151 are first threaded within the openings 147 and then bent away from the vane member 93 so as to be on a radial inclination with the same operating to prevent the unintentional removal thereof.

Additionally, the rotor member 132 is provided with stepped holes 154 in the inlet channel 138 and the outlet channel 139 extended towards the shaft 133 so as to provide a fluid passageway into an elongated axially extended opening 156. Mounted within the stepped holes 154 are ball-type check valves 158 and 159, each being substantially identical so only one need be described in detail. The check valve 158 is provided with a ball member 160 mounted with the hole 154 engageable with a seat portion 162 and held therein by a cylindrical cup member 163. It is obvious that fluid pressure within the inlet channel 138 operates to move the ball member 160 towards the longitudinally extended opening 156 to seal the same against the seat portion 162 to prevent fluid leakage therethrough.

As shown in FIG. 12, the pressure regulator means 130 includes an upright housing 165 having a cylindrical chamber 167 therein and an open end 168 covered by a closure plate 170 which is secured thereby by a plurality of bolt members 172. Mounted within the chamber 167 is a sealing cup member 175 having an open end 176 in which is mounted a compression spring member 178 operable to force the cup member 175 downwardly into engagement with a pair of passageways 179 and 181 leading to the circumferential grooves 127 and 128, respectively. An outer surface of the cup member 175 is provided with cut-out, ring portion 183 adapted to receive an O-ring 184 for sealing engagement with the housing 165. The closure plate 170 is provided with a central threaded opening 186 to receive an adjusting nut and bolt 187 engageable with a centralizing plate 188. The outward end of the compression spring member 178 is mounted about the plate 188 whereupon axial movement of the bolt 187 operates to increase and decrease the compression force of the spring member 178. It is obvious that fluid pressure against the bottom sealing surface of the cup member 175 exceeding the force of the compression spring member 178 would operate to raise the same permitting fluid flow through the passageways 179 and 181 and similarly, for example, from channel 138 to channel 139.

In the use and operation of the power means 114 of this invention, the rotor means 116 can be driven in a conventional manner by a motor member (not shown) to rotate the same thereby providing for the intake and exhaust of fluid therein in a manner substantially identical to the explanation of the use and operation of the first embodiment, namely the power means 20. However, on the rotation of the rotor means 116 in a counterclockwise direction as viewed in FIG. 11, the blade member 149 is moving within the inlet channel 138, and operating to deflect fluid within the inlet channel 138 and the corresponding circumferential groove 127 to divert the same downwardly towards the first conduit means 142 and the opening 141 so as to aid in movement of the same axially to fill intake sections 190 between the outer spacer plates 134 and 136 and the cam plates 126 and 129 respectively. The addition of the blade members 149 and 151 operate to permit the rapid rotation of the rotor means 116 while preventing fluid starvation within the intake sections 190 allowing the same to operate efficiently and effectively at high speeds. It is noted that the use of both blade members 149 and 151 permits the same operation to be achieved regardless of the direction of rotation of the rotor means 116.

Also in the power means 114, the pressure regulator means 130 is readily adjustable by axial movement of the adjustment bolt 187 to increase and decrease as desired the pressure upon the sealing cup member 175 whereupon when a given pressure, for example 500 p.s.i., is reached, the fluid under this pressure in the outlet channel 139 operates to move the cup member 175 outwardly and permit a passage of this excessive pressure fluid into the inlet channel 138 to assure that the power means 114 is not operated at excessive pressure. It is obvious that the pressure regulator means 130 creates a controlled pressure output and acts as a safety device to prevent damage to the drive motor and the power means 114 in case an outlet portion becomes clogged or inoperative. Also, the ball-type check valves 158 and 159 are operable under conditions whereupon high pressure fluid leakage between the cylindrical body 119, the spacer plates 134 and 136, and the cam plates 126 and 129 presents a high pressure against the bearing members 141. With such high pressure leakage, the subject fluid is movable into the elongated opening 156 and against the ball-type check valves 158 and 159. The check valve 159 is within the high pressure or outlet channel 139 which seals the ball member 160 against the seat portion 162 so the fluid cannot enter into this channel. However, because of the lower pressure within the inlet channel 138 the fluid under pressure in the opening 156 can easily move the respective ball member 160 outwardly so as to allow the fluid to move into the inlet channel 138 thereby preventing damage to the bearing members 140.

It is seen that the third embodiment of the power means 114 presents additional structures to permit the same to operate more satisfactorily under high speeds to achieve a desired pressure through a pressure regulating means, and to present check valve members operable to allow fluid to move into the inlet channel to prevent damage and external fluid leakage. It is obvious that the use of the check valve members 158 and 159 is necessary so that the power means 114 can be operated in either direction of rotation and, for the same reason, the dual blade members 149 and 151 permits the operation thereof in either direction of rotation.

Figure 13:
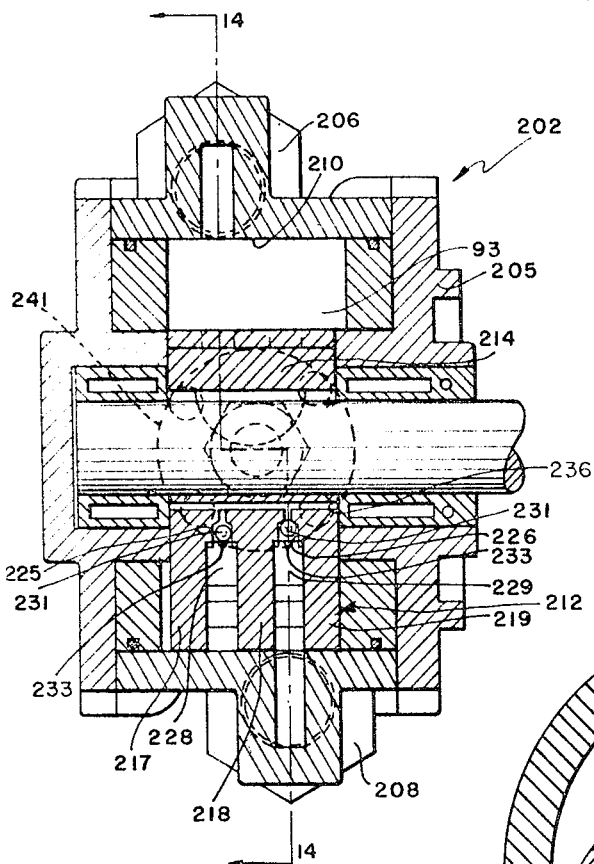
FIG. 13 is a fragmentary sectional view of a fourth embodiment of the power means of this invention.
Figure 14:
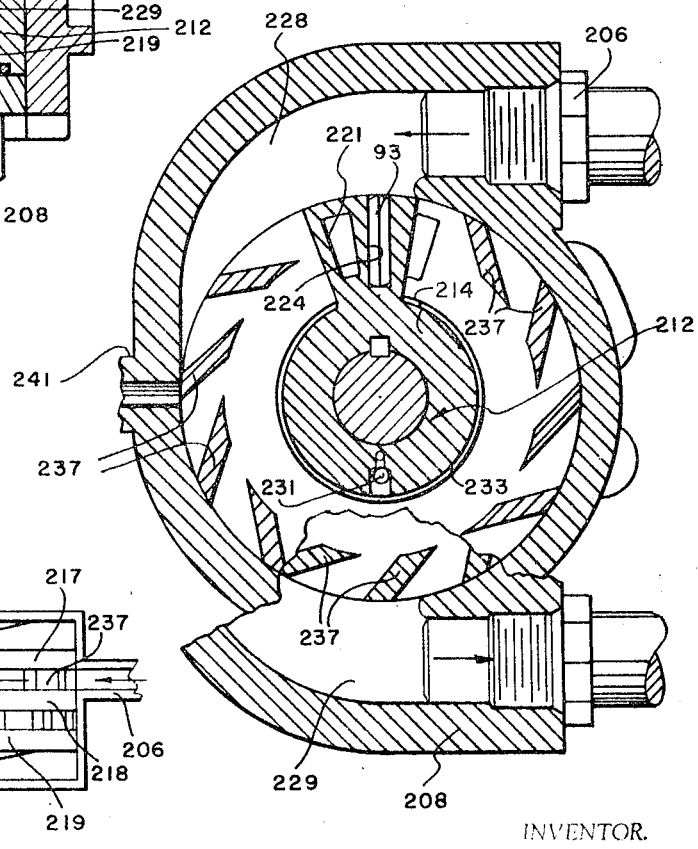
FIG. 14 is a sectional view taken along line 14—14 in FIG. 13.
Figure 15:
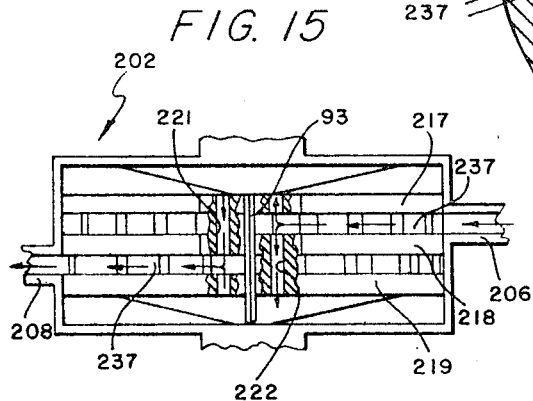
FIG. 15 is a schematic diagram similar to FIG. 9 illustrating the operation of the fourth embodiment of the power means of this invention.

In a fourth embodiment of a power means 202 of this invention, as illustrated in FIGS. 13–15, inclusive, a housing means 205 is provided with an inlet section 206 and an outlet section 208 each projected substantially tangentially to a central cavity 210 in which is rotatably mounted a rotor means 212. The rotor means 212 is provided with a central hub 214 having radially extended spacer plates 217, 218, and 219 and first and second conduit means 221 and 222 which are integrally cast with the central hub 214. One of the vane members 93 is extended within a slotted opening 224 extended transversely of the spacer plates 217, 218 and 219. A pair of fluid leakage channels 225 and 226 are each extended within inlet and outlet channels 228 and 229 between the spacer plates 217, 218, and 218, 219, respectively and are operable with a ball member 231 similar to the previously described ball-type check valves 158 and 159. Retainer rings 233 are mounted about the central hub 214 so as to maintain the ball members 231 therein. It is obvious that the ball members 231 are operable to release pressure fluid from within an elongated central opening 236 resulting from leakage between the housing means 205 and the rotor means 212. The major difference in the power means 202 is the provision of inclined directional blade members 237 which can be formed as an integral part in the manufacturing and casting of the rotor means 212. The blade members 237 are substantially equally spaced facing inwardly at approximately a 30-degree angle relative to the outer periphery of the spacer plates 217, 218, and 219. It is seen that the blade members 237 are inclined inwardly rearwardly in the inlet channel 228 relative to the direction of rotation so as to aid in pulling in the fluid thereto to completely fill the intake section therewithin similar to the operation of the embodiments previously described. The other blade members 237 mounted within the outlet channel 229 are inclined in the opposite direction and operable on rotation thereof to aid in throwing or forcing the pressure fluid outwardly through the outlet section 208. It is seen that the reverse inclination of the plurality of blade members 237 permits the rotation of the rotor means 212 in either direction as desired. It is obvious, therefore, that the power means 202 is operable to produce efficiently and effectively a maximum output with the plurality of blade members 237 operable to aid in the intake and exhaust of fluid therefrom so that the same is highly efficient at both low and high speeds. The power means 202 is also provided with a pressure regulator means 241 operable in a manner substantially identical to the pressure regulator means 130 previously described and further discussion thereof is not deemed necessary.

In the operation of the power means 202 as shown in FIG. 15, it is seen that the inlet fluid moves transversely of the spacer plates to fill the intake sections behind the vane member 93 and the fluid within the exhaust sections are forced outwardly by rotation of the vane member 93 for discharge through the outlet section 208 in a manner similar to the power means 202 and 114 as previously described and further discussion thereof is not deemed necessary.

It is seen that the rotary power means of this invention presents an efficient and effective means of providing a motor means or pump means which is operable at high and low speeds without vibration to produce a constant volume, non-pulsating output. It is seen that the various embodiments of the power means of this invention present simplified structures the only moving parts being a rotating rotor member with an axially movable vane member operable to control the intake and exhaust of fluid therefrom in a highly efficient manner resulting in a minimum amount of repair and maintenance. In another embodiment of the power means of this invention, means are provided to regulate the pressure to be produced therein to prevent damage to the overall system. Ball-type check valve members are provided to prevent both external fluid leakage from the power means and damage to the various bearing members therein. Additionally, it is seen that the power means is readily provided with blade members operable to increase the effectiveness and efficiency of operation so as to be highly efficient at high and low speed operations. It is obvious that the power means of this invention is operable to be driven as a motor means by various types of fluid mediums and also operable as a pump means to create pressure increases regardless of the density of the fluid medium being used.

It is also obvious that the power means of this invention could be operable as an internal combustion engine on the addition of ignition means such as spark plugs or the like whereupon the compressed fluid is ignited so as to expand against the vane member or plurality of vane members to produce an output therefrom.

As will be apparent from the foregoing description of the preferred embodiments of the applicant's power means, relatively simple and inexpensive means has been provided which is readily usable as a power means or motor means. Applicant's construction eliminates a great deal of expensive, high precision movable part members normally involved in the vane-type power means and, therefore, presents an inexpensive, easy to manufacture, highly efficient power means.

While the invention has been described in connection with preferred specific embodiments thereof, it will be understood that this description is intended to illustrate and not to limit the scope of the invention, which is defined by the following claims.

I claim:
1. A rotary power means operable with a fluid medium, comprising:
    (a) housing means having a main body forming a cavity therein, said body having inlet and outlet conduits secured thereto,
    (b) rotor means rotatably mounted within said main body having a rotor member formed with inlet and outlet channels, said rotor means having at least one vane member extended transversely of said rotor member in fluid sealed engagement with said housing means,
    (c) cam means secured to said housing means in continuous engagement with said vane member and having relatively high cam areas in contact with said rotor member to form first and second fluid sections before and after, respectively, of said vane member between said rotor member and said cam means, and
    (d) means to rotate said rotor means operable to continuously decrease in area said first fluid sections and increase in area said second fluid sections,
    (e) said rotor member having first, second and third parallel, radially extending spacer plates,
    (f) said inlet channel formed between said first and second spacer plates,
    (g) said outlet channel formed between said second and third spacer plates, and
    (h) said rotor means having a first conduit means extending transversely of said first, second, and third spacer plates to interconnect said outlet channel and said first fluid sections, and a second conduit means extended transversely of said first, second, and third spacer plates to interconnect said inlet channel and said second fluid inlet.

2. A rotary power means as described in claim 1, including:
    (a) at least one blade member mounted between said first and second spacer plates extended radially to a position adjacent said main body operable to deflect fluid within said inlet channel inwardly for movement into said second fluid section thereby assuring a sufficient supply of fluid regardless of rotational speed of said rotor means.

3. A rotory power means as described in claim 1, including:
    (a) a first plurality of said blade members spaced between said first and second spacer plates and a second plurality of said blade members spaced between said second and third spacer plates, and
    (b) said first blade members and said second blade members operable to pull fluid into said inlet conduit and throw fluid from said outlet conduit, respectively, on rotation of said fluid from said outlet conduit, respectively, on rotation of said rotor means to increase the efficiency of operation.

4. A rotary power means operable with a fluid medium, comprising:
    (a) housing means having a main body forming a cavity therein, said body having inlet and outlet conduits secured thereto,
    (b) rotor means rotatably mounted within said main body having a rotor member formed with inlet and outlet channels, said rotor means having at least one vane member extended transversely of said rotor member in fluid sealed engagement with said housing means,
    (c) cam means secured to said housing means in continuous engagement with said vane member and having relatively high cam areas in contact with said rotor member to form first and second fluid sections before and after, respectively, of said vane member between said rotor member and said cam means, and (d) means to rotate said rotor means operable to continuously decrease in area said first fluid sections and increase in area said second fluid sections, (e) said rotor member having an axially extended opening and transverse holes to connect said opening to said inlet channel and said outlet channel, respectively, and (f) check valve means mounted in said holes operable on excessive fluid pressure in said opening to by-pass the excessive fluid into said inlet channel and said outlet channel if the fluid pressures therein are lesser.

5. A rotary power means operable with a fluid medium, comprising:

(a) housing means having a main body forming a cavity therein, said body having inlet and outlet conduits secured thereto, (b) rotor means rotatably mounted within said main body having a rotor member formed with inlet and outlet channels, said rotor means having at least one vane member extended transversely of said rotor member in fluid sealed engagement with said housing means, (c) cam means secured to said housing means in continuous engagement with said vane member and having relatively high cam areas in contact with said rotor member to form first and second fluid sections before and after, respectively, of said vane member between said rotor member and said cam means, and (d) means to rotate said rotor means operable to continuously decrease in area said first fluid sections and increase in area said second fluid sections, (e) said rotor means having a shaft member secured to said rotor member and connected to said rotating means for the rotation thereof so as to function as a pump means, (f) said rotor member having inner, outer, and central parallel spacer plates separated by said inlet channel and said outlet channel, (g) said outer spacer plate having an opening therein and said central and inner plates having first conduit means to supply fluid transversely thereof to said second fluid sections, and (h) said inner spacer plate having an opening therein and said central and outer spacer plates having a second conduit means to supply fluid transversely thereof to said first fluid section for discharge through said outlet conduit on rotation of said vane member.

References Cited
UNITED STATES PATENTS

| | | | |
|---|---|---|---|
| 2,020,611 | 11/1935 | Knapp | 91—126 X |
| 2,083,560 | 6/1937 | Grey et al. | 103—139 |
| 2,154,456 | 4/1939 | Knapp | 103—139 |
| 2,466,623 | 4/1949 | Tucker et al. | 103—139 |
| 2,475,844 | 7/1949 | Jones | 103—139 |
| 2,549,646 | 4/1951 | Thomas | 91—126 X |
| 2,593,457 | 4/1952 | Jastrzebski | 103—139 X |
| 2,980,030 | 4/1961 | Couturier | 103—139 |
| 3,373,689 | 3/1968 | Brunson | 103—42 |

DONLEY J. STOCKING, Primary Examiner

W. J. KRAUSS, Assistant Examiner

U.S. Cl. X.R.

91—126; 103—42; 123—16; 230—152